United States Patent
Wier

Patent Number: 6,142,004
Date of Patent: Nov. 7, 2000

[54] LOAD-BEARING SHAPED PART AND A METHOD FOR MANUFACTURING SHAPED PARTS

[75] Inventor: Franz Wier, Göggingen, Germany

[73] Assignee: TRW Occupant Restraint Systems GmbH, Alfdorf, Germany

[21] Appl. No.: 08/929,737

[22] Filed: Sep. 15, 1997

[30] Foreign Application Priority Data

Sep. 19, 1996 [DE] Germany ........................... 196 38 441
Apr. 25, 1997 [EP] European Pat. Off. .............. 97106918

[51] Int. Cl.$^7$ .................................................. B21C 23/00
[52] U.S. Cl. ................................ 72/254; 72/267; 72/359; 72/377
[58] Field of Search .............................. 72/254, 260, 264, 72/267, 352, 359, 377, 253.1, 256, 358; 29/893.33, 893.34, 893.36

[56] References Cited

U.S. PATENT DOCUMENTS

| | | | |
|---|---|---|---|
| 3,408,846 | 11/1968 | Schofield | 72/254 |
| 3,508,427 | 4/1970 | Broderick | 72/254 |
| 3,739,620 | 6/1973 | Jesmore et al. | |
| 4,055,978 | 11/1977 | Torralba | 72/254 |
| 4,084,423 | 4/1978 | Schlecht | 72/264 |
| 4,166,373 | 9/1979 | Braun | 72/267 |
| 4,295,357 | 10/1981 | Roper | 72/358 |
| 5,029,896 | 7/1991 | Ernst | |
| 5,104,193 | 4/1992 | Fohl | |
| 5,398,408 | 3/1995 | Bernet | 29/893.33 |
| 5,522,246 | 6/1996 | Simon | 72/260 |
| 5,546,647 | 8/1996 | Pruna | 72/359 |
| 5,730,812 | 3/1998 | Lawrence | 72/352 |

FOREIGN PATENT DOCUMENTS

| | | | |
|---|---|---|---|
| 57-181739 | 9/1982 | Japan. | |
| 62-224442 | 2/1987 | Japan. | |
| 04160239 | 3/1992 | Japan. | |
| 4-66215 | 3/1992 | Japan | 72/254 |

*Primary Examiner*—Ed Tolan
*Attorney, Agent, or Firm*—Tarolli, Sundheim, Covell, Tummino & Szabo L.L.P.

[57] ABSTRACT

A method is provided, which comprises the following steps: Firstly, a profiled material of aluminum is prepared. Then, a profiled piece of predetermined length is produced by cutting the profiled material to length. This profiled piece is then inserted into a press. Finally, the profiled piece is pressed into the desired shape in the press. Further, a shaped part is provided, which consists of cold-worked aluminum.

18 Claims, 12 Drawing Sheets

LOAD-BEARING SHAPED PART AND A METHOD FOR MANUFACTURING SHAPED PARTS

The invention relates to a method for the manufacture of shaped parts. The invention also relates to a load-bearing shaped part.

BACKGROUND OF THE INVENTION

Load-bearing shaped parts can be used in various fields of engineering. As an example, various applications in the field of vehicle occupant restraint systems are explained hereinbelow. However, it is expressly pointed out that the invention can be applied to all fields of engineering.

A shaped part to which the invention can be applied is, for example, a locking catch which can be used to connect a belt tensioner drive with the belt spool of a belt winder. The locking catch is part of a coupling which in normal state separates the belt winder from the belt tensioner drive, so that the belt spool of the belt winder is freely rotatable. If, however, the belt tensioner drive is activated, for example by a sensor arranged on the vehicle, which establishes that given thresholds of the vehicle deceleration have been exceeded, the belt tensioner drive must be coupled with the belt spool within the shortest period of time, in order to provide a rotation of the belt spool in the belt webbing winding direction. Owing to the required short response time and also the moment of rotation which is to be transferred, the locking catch is exposed here to high stresses.

In order to reliably reach the desired strength, the locking catch is usually produced as a sintered piece. In this way, in addition to the necessary strength, also the required accuracy of shape can be obtained. Alternatively, such a shaped part can also be produced by machine working of a blank made of steel. In each case, high manufacturing costs are incurred. In addition, cold impact pressings of steel are known. A disadvantage here is the high expenditure of energy on forming. Furthermore, in shaped parts of steel, the comparatively high weight is a disadvantage.

BRIEF DESCRIPTION OF THE INVENTION

The invention provides a method by which shaped parts can be produced with less expenditure than in the prior art. The method according to the invention contains the following steps: Firstly, a profiled material of aluminum is prepared. Then, a profiled piece of predetermined length is produced by cutting the profiled material to length. This profiled piece is then inserted into a press. Finally, the profiled piece is pressed into the desired shape in the press. This method makes use of the finding, surprising for the specialist in the art, that shaped parts of an aluminum alloy, despite the actually insufficient strength of aluminum alloys, are fully capable of replacing shaped parts of steel. By the forming of the profiled piece in the press, the material is in fact cold-worked, whereby an increase in strength of up to 60% can be produced. A shaped part which is cold-worked in such a way then has a strength which is sufficient for the intended applications; depending on the materials which are to be compared, a strength can also be achieved which is comparable with that of shaped parts made of steel. Therefore, a distinct saving of weight can be achieved. Since, furthermore, the profiled piece, i.e. the blank to be formed into the shaped part, is produced starting from a profiled material which is for example supplied continuously, a particularly favorable manufacturing method is provided. Furthermore, a favorable effect on the manufacturing method is the fact that the profiled piece is pressed into the desired form in conventional presses, i.e. in devices which are distinctly more favorably priced and simpler compared with sintering devices, for example.

According to a preferred embodiment of the invention, it is provided that the profiled material has a cross-section which is adapted to the shaped part to be produced. This embodiment of the invention is based on the finding that the expenditure for the manufacture of the shaped parts can be further reduced if the profiled material is already prepared with a cross-section which is as far as possible adapted to the configuration of the shaped part. In fact, even though profiled aluminum materials are available in a large variety of cross-sectional shapes, an existing section will only rarely fulfill the requirement that its cross-section corresponds to the outline of the configuration of the shaped part, possibly with a given excess. However, the manufacture of such a special section solely for the purpose of preparing profiled pieces which can be deformed into blanks for the desired shaped parts by pressing, requires merely an expenditure which is negligible compared with the savings with respect to conventional manufacturing methods. In other words, by preparing a suitably configured profiled material, which can be produced continuously at little expenditure, for example by extruding, a large number of profiled pieces, connected with each other, are obtained, which only have to be separated from each other. Compared in particular with sintering methods, for example, in which each individual shaped part is produced individually, the simplification which is achieved is obvious.

Preferably, it is provided that the cross-section of the profiled material corresponds to the projection of the shaped part which is to be produced, plus an excess. This embodiment of the invention is based on the finding that the optimum cross-section for the profiled material can be determined in a particularly simple manner making a projection of the shaped part which is to be produced into one plane. An excess is then added to the area obtained in this way, in order to obtain the cross-section of the profiled material. The excess ensures that during pressing of the profiled piece into the desired shape, a sufficiently high degree of forming occurs, so that the desired cold-working of the material is achieved. This excess is usually less than approximately 25%; preferably the excess amounts to between approximately 10% and approximately 20%.

If the shaped part has a central axis, the cross-section of the profiled material is preferably obtained starting from a projection of the shaped part into a plane perpendicular to the central axis. In this projection direction, the cross-section of the profiled material is preferably obtained based on a projection of the shaped part into a plane parallel to the extension plane of the shaped part. In this projection direction, the cross-section of the profiled material is optimally adapted to the manufacture of generally flat shaped parts.

According to the invention, it can be provided that the profiled material is soft-annealed before cutting to length. Alternatively, it can also be provided that the profiled piece is soft-annealed. Through the soft-annealing, a cold-working which has already occurred in the manufacture of the profiled material, for example by extruding, can be eliminated again, so that profiled pieces of a readily formable aluminum alloy are present.

According to the invention, it can also be provided that the shaped part is hardened after pressing, for instance by thermal hardening or strain hardening. In this way, the strength of the pressed shaped part can be further increased.

The invention also relates to a load-bearing shaped part. According to the invention, it is provided that such a shaped part consists of cold-worked aluminum. Such a shaped part offers the advantage that it can be produced in a particularly simple manner, namely by pressing a profiled piece. The specialist in the art has not hitherto taken such shaped parts into consideration, because the comparatively high strength of steel together with a sufficient workability of the material has led to satisfactory results, and aluminum alloys, owing to their lower strength and their higher costs, did not promise any kind of advantages. However, the invention is based on the finding that with a technologically comparatively simple method, namely the pressing of profiled pieces in a press, such increases with regard to the strength of the obtained shaped parts can be achieved that shaped parts of a cold-worked aluminum alloy can replace the hitherto usual shaped parts made of steel.

Such a shaped part according to the invention can be, in particular, a load-bearing component of a vehicle occupant restraint system. As in vehicle occupant restraint systems a high degree of accuracy, an extremely high security from failure in combination with a high strength of the component and also, owing to the high quantities, a favorably priced manufacturing method are required, the invention offers special advantages in such components.

Further advantageous aspects of the invention will emerge from the dependent claims.

BRIEF DESCRIPTION OF THE DRAWINGS

The invention is described hereinbelow with reference to various embodiments which are illustrated in the enclosed drawings in which.

DETAILED DESCRIPTION OF THE INVENTION

Figure 1:
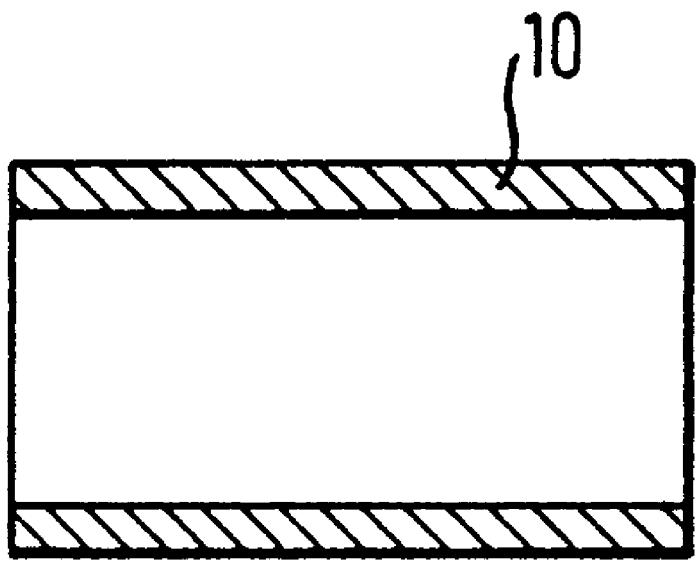
FIG. 1 shows a longitudinal section through a profiled piece which can be used in a method according to the invention.

With the aid of FIGS. 1 to 6, the method according to the invention is schematically described. By cutting a profiled material (not shown) of an Aluminum alloy to length, the profiled piece 10 illustrated in FIG. 1 is obtained. The profiled material can be provided, for example, on a supply reel. The respective length of the profiled piece is determined on the basis of the volume of the shaped part which is to be produced, so that the volume of the profiled piece is at least equal to the volume of the shaped part plus the volume decrease of the profiled piece resulting from compacting the material, occurring in the course of the process, which, however, is very small. The profiled material is an Aluminum alloy of strength classifications F17 to F50. Preferably, either the profiled material is soft-annealed before cutting to length or the produced profiled piece 10 is soft-annealed before further processing, so that the cold working of the aluminum alloy occurring in the manufacture of the profiled material is eliminated and a very good formability of the material is produced.

Figure 2:
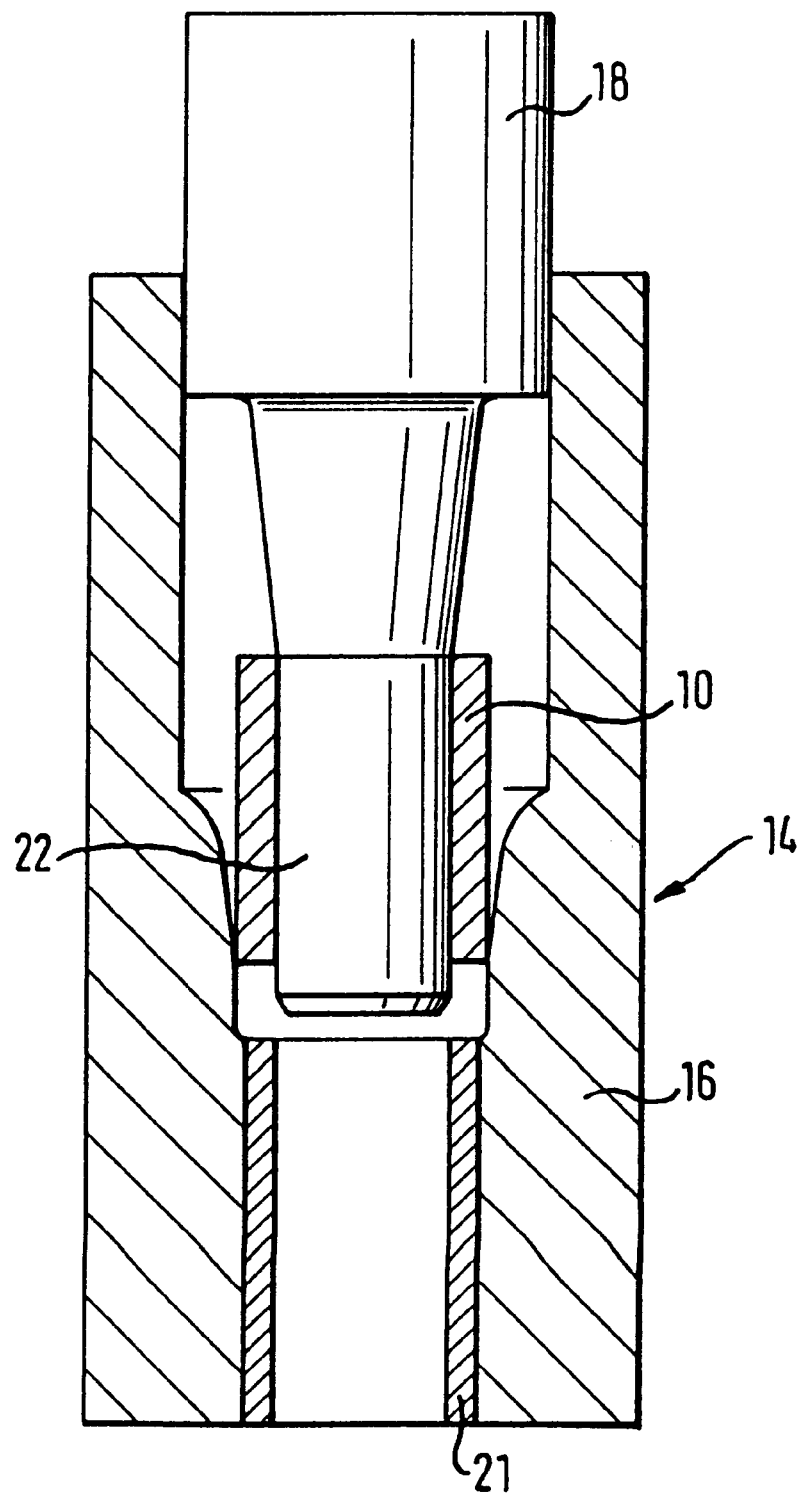
FIGS. 2 to 5 diagrammatically show four process steps manufacturing a shaped part by a method according to the invention.

The profiled piece 10 is then inserted into a press 14, which consists substantially of a die 16 and a punch. In addition, in the interior of the die 16 an ejector 21 is provided which is movable relative thereto. In FIG. 2, it is illustrated how the profiled piece 10 is inserted into the die 16. Then, the punch 18 is introduced into the die 16 until a plunger protrusion 22, the outer diameter of which is slightly smaller than the internal diameter of the blank 10, engages therein.

Figure 3:
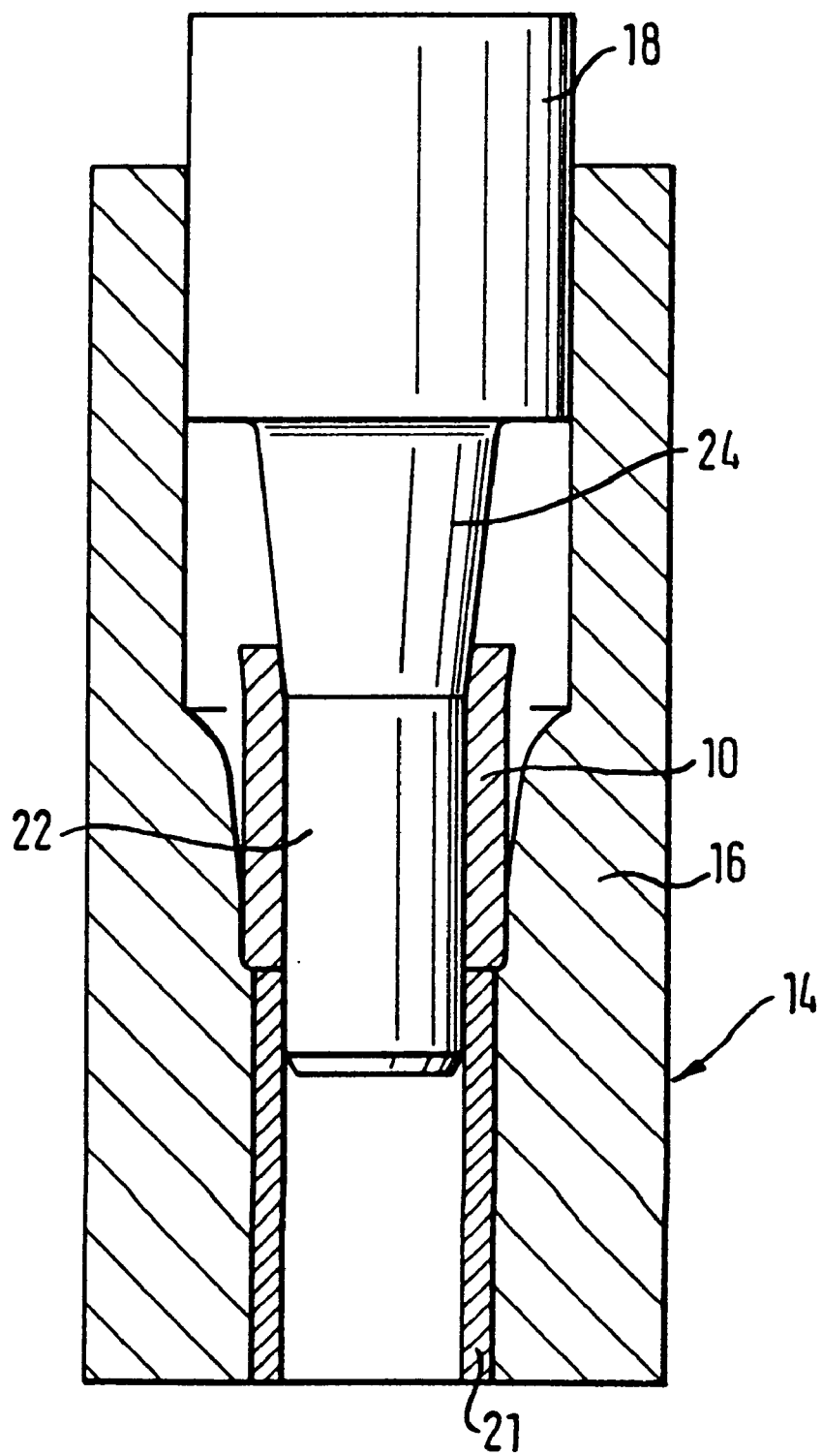

As can be seen in FIG. 3, the punch 18 is forced further into the die 16, whereby the profiled piece 10 on the one hand is forced into the die 16 until it lies against the ejector 21, and on the other hand is flared slightly at its opposite axial end by means of a punch cone 24 adjoining the plunger protrusion 24.

Figure 4:
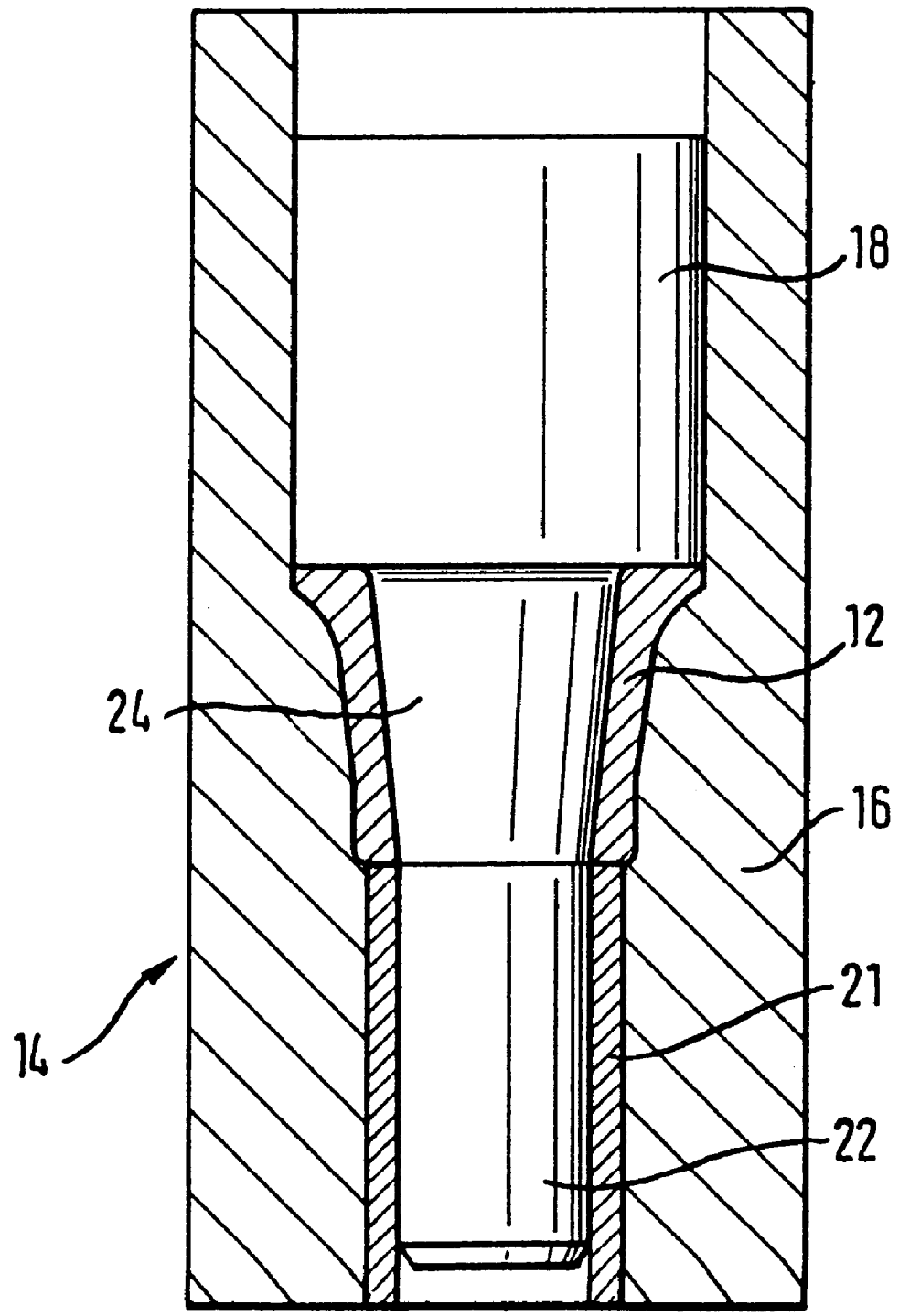

In FIG. 4, it can be seen that the punch 18 was forced completely into the die 16. The profiled piece 10 was thereby pressed into the desired shape, so that a shaped part 12 has been produced.

Figure 5:
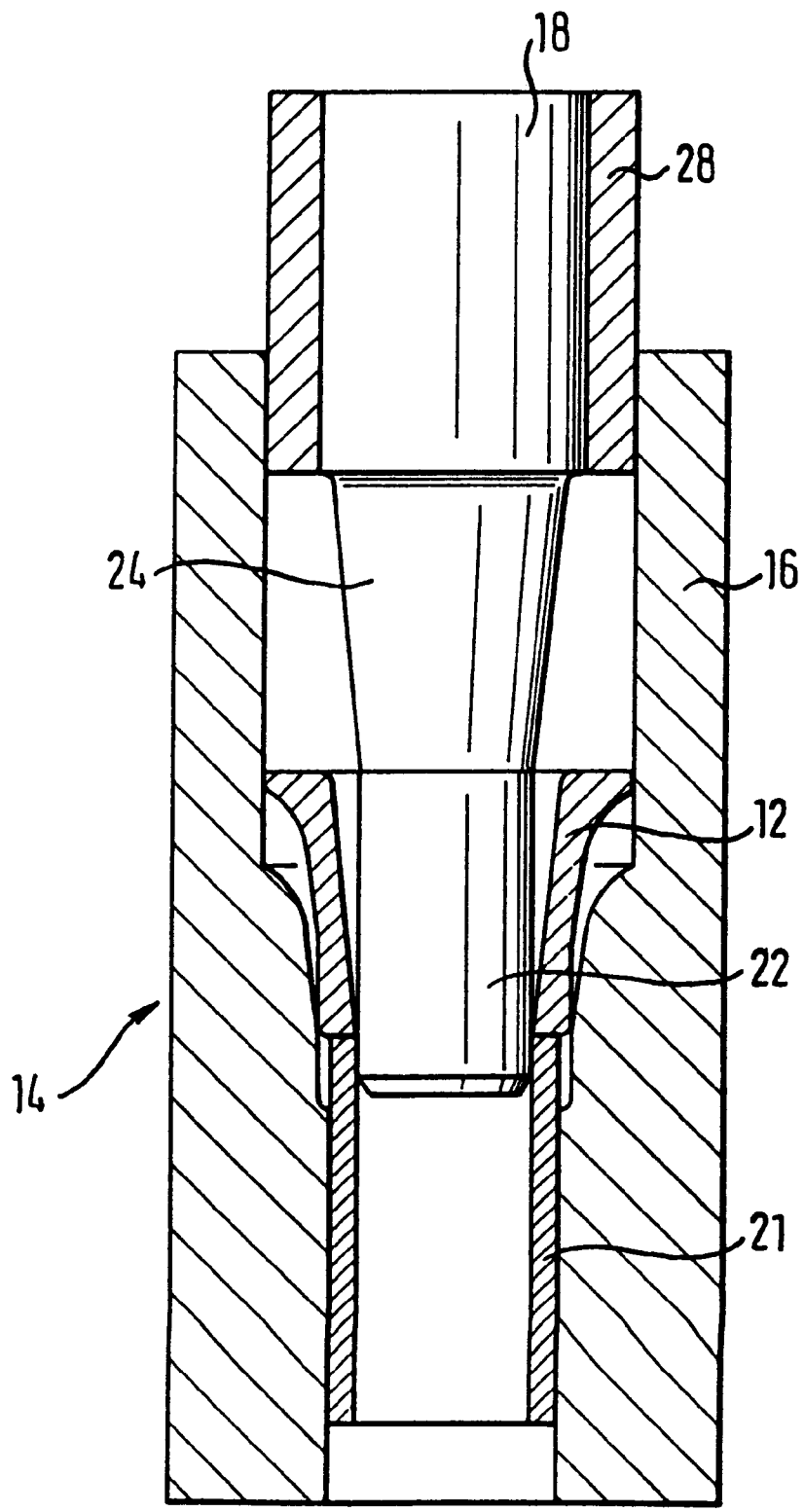
Figure 6:
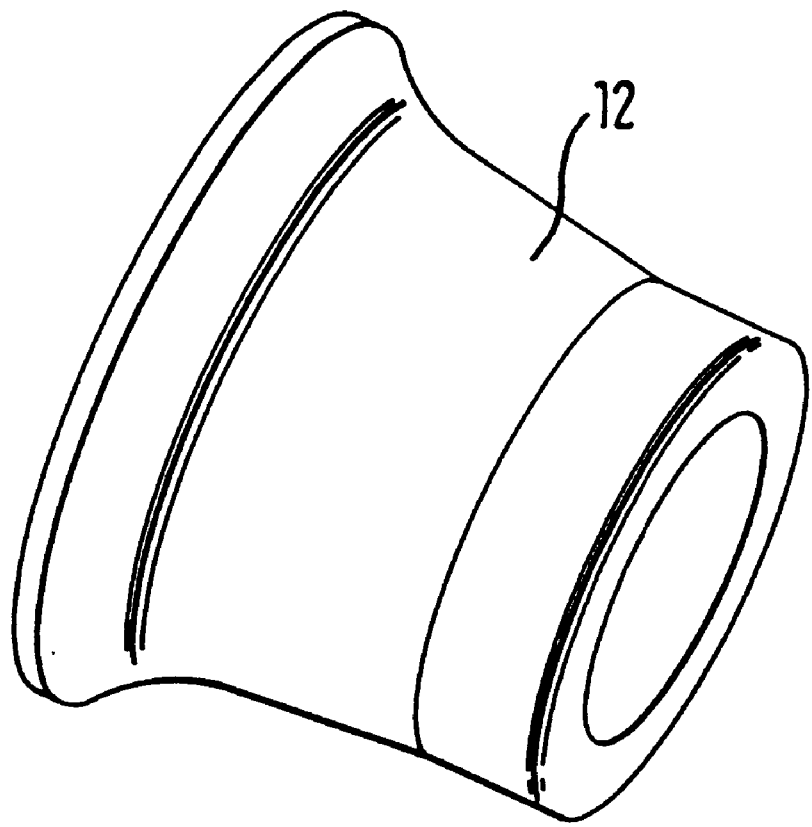
FIG. 6 shows a perspective view of the shaped part produced by the method illustrated in FIGS. 2 to 5.

In FIG. 5 it is shown that the shaped part 12 is pressed out from the die 16 by means of the ejector 21. If it proves to be necessary, an ejector ring 28, illustrated diagrammatically in FIG. 5, can also be provided on the die 18, in order to detach the pressing 12 from the punch 18.

On colliding of the punch 18 and the die 16, the profiled piece 10 which is inserted into the press 14 is deformed so intensively that a cold forming of the material occurs. This cold forming can lead to an increase in strength by up to 60%. If it proves to be necessary, the strength of the shaped part 12 which is obtained can be further increased by the material of the shaped part 12 being hardened after pressing, for example by thermal hardening or strain-hardening. If the volume of the profiled piece was selected by suitable cutting to length equal to the volume of the shaped part which is to be obtained, the shaped part is produced directly by pressing, without a subsequent processing being necessary. If the volume of the profiled piece were selected to be slightly greater than the volume of the shaped part which is to be produced, a blank results after pressing, which has an excess of material compared with the shaped part which is to be produced. This excess of material can either be present as a local extension, which is cut off, or as a sheet-like excess, which is removed.

Figure 7:
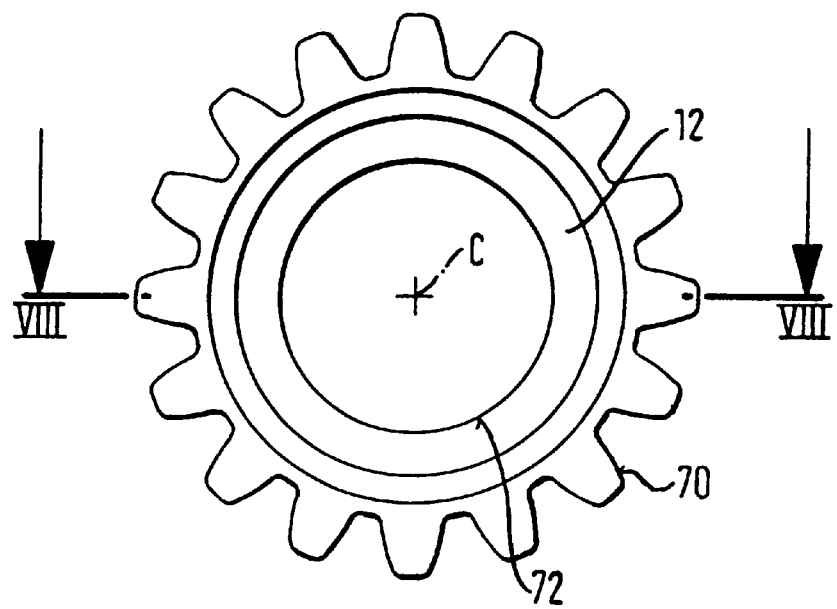
FIG. 7 shows a top view of a shaped part which was produced by a method according to the invention.
Figure 8:
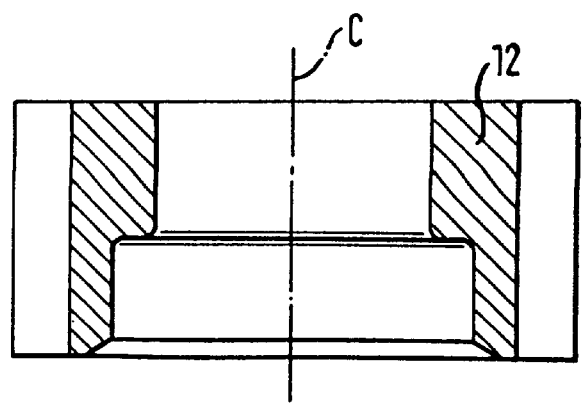
FIG. 8 shows the shaped part of FIG. 7 in a sectional view along the line VIII—VIII of FIG. 7.
Figure 8A:
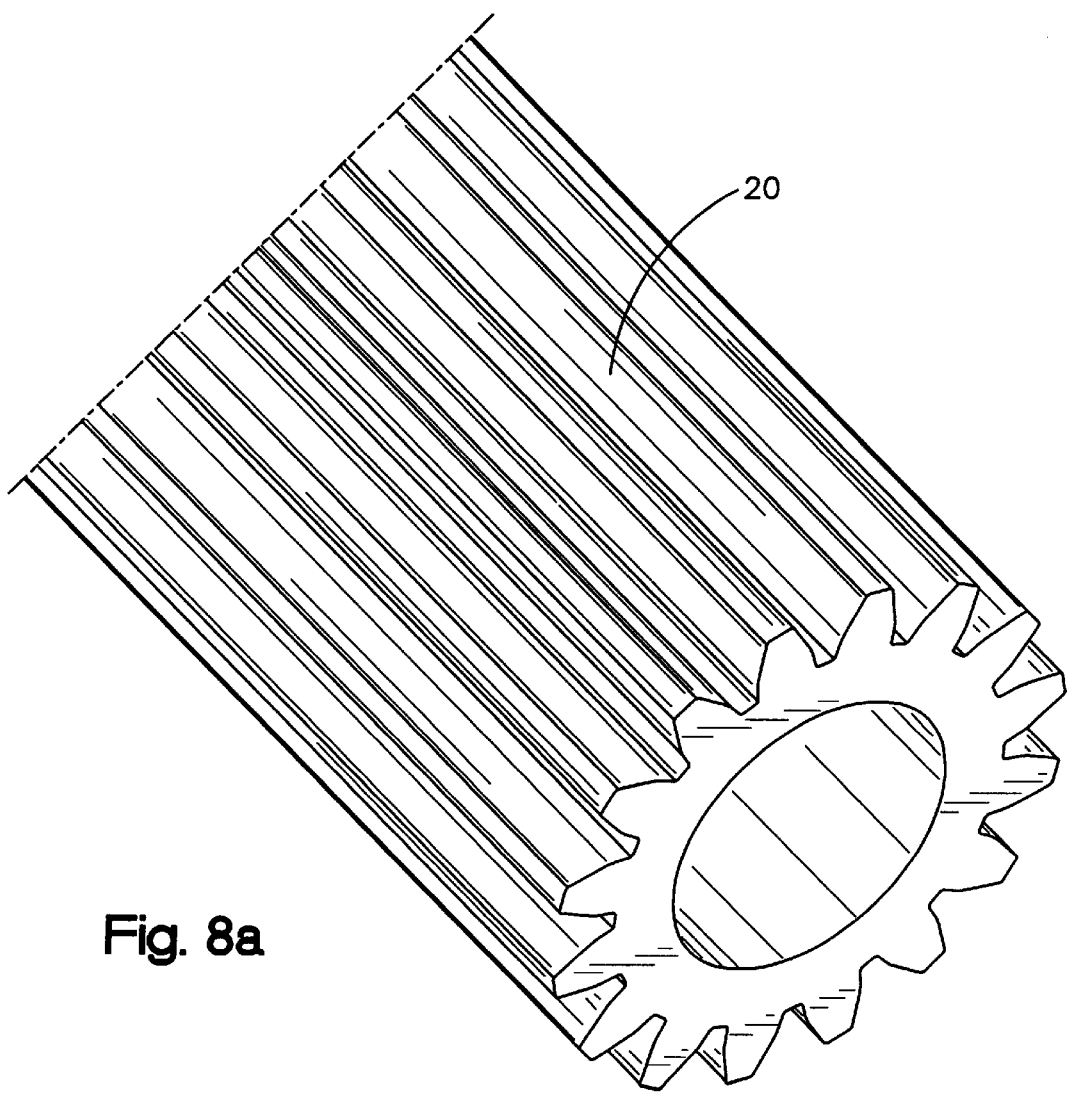
FIG. 8a shows a perspective view of a profiled material, starting from which the shaped part shown in FIGS. 7 and 8 can be produced.

In FIGS. 7 and 8, a shaped part according to the invention is illustrated, which was produced by the method according to the invention. The shaped part 12 is in this case a gear wheel which has an opening along a central axis C, this opening being constructed as a stepped bore. For preparing a suitable profiled material, firstly the shaped part to be produced is analyzed, with an axis being defined, which is the central axis C of the shaped part. The shaped part 12 is projected into a plane perpendicular to this axis C, for example the plane of the drawing. Consequently, an outer circumferential line 70 is produced, given by the outer contour of the gear wheel, and an inner circumferential line 72, given by the section of the stepped bore with the smallest diameter. To this given area between the two circumferential lines, an excess is added which amounts to between approximately 10% and approximately 20%, in order to obtain the actual cross-section of the profiled material which is to be used. Therefore, as starting material for the production of the shaped part illustrated in FIGS. 7 and 8, a profiled material 20 is used which is approximately tubular (see FIG. 8a), the internal diameter of this tube being determined by the smallest diameter of the opening of the gear wheel and the outer contour already having the teeth which correspond to the gear wheel which is to be manufactured. Differences between the dimensions of the profiled material and the dimensions of the finished shaped part will result, however, from the excess described above. The length which the profiled piece must have, which is to be produced by cutting the profiled material to length, results, as was set forth above, by means of the volume which the finished shaped part 12 has. The profiled piece which is thus obtained is then formed into the shaped part 12 in a press which is adapted to the configuration of the shaped part to be produced. It is also possible for the excess to merely be added in the direction of the axis C of the shaped part.

Figure 9:
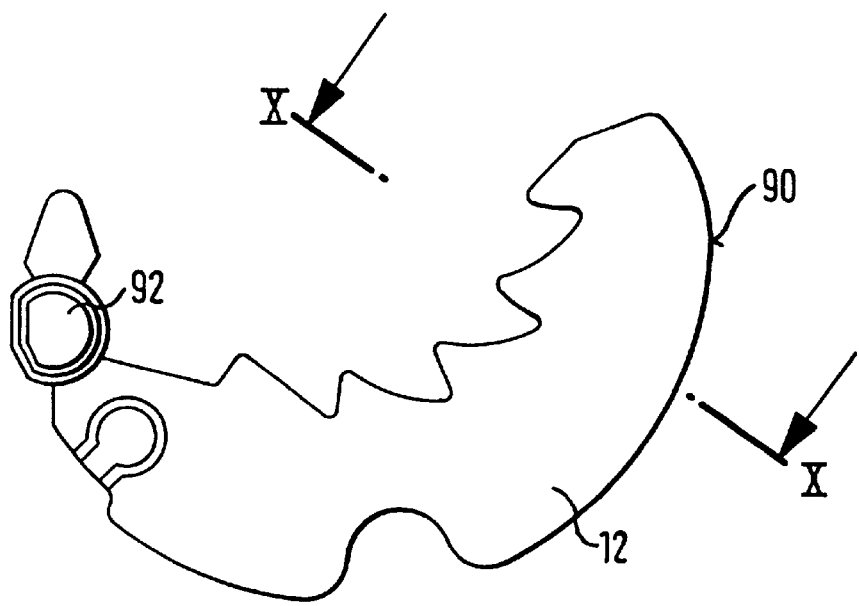
FIG. 9 shows a side view of a another shaped part which was produced by a method according to the invention.
Figure 10:
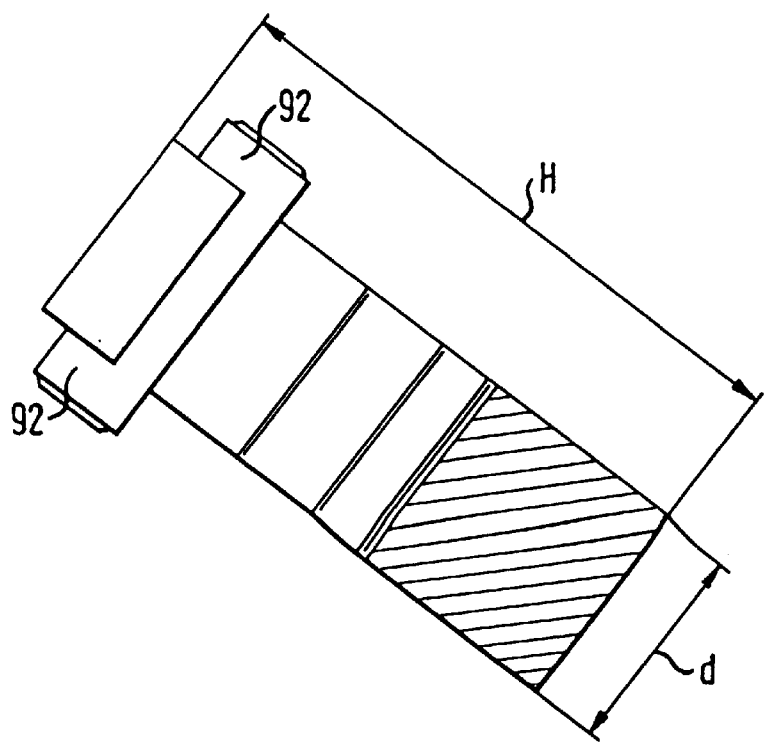
FIG. 10 shows a top view of the shaped part of FIG. 9, partially in section along the line X—X of FIG. 9.

In FIGS. 9 and 10, a different shaped part 12 is illustrated, which was produced by the method according to the invention. This shaped part 12 is a locking catch which can be used, for example, to connect a belt tensioner drive with a belt winder. With a height H of approximately 20 mm and a thickness d of about 7 mm, this locking catch is able to transfer a moment of rotation of up to approximately 100 Nm. Also in this shaped part 12 which is to be produced, the cross-section of the profiled material which is to be used as the starting point is obtained by a projection of the shaped part 12 into one plane. As the shaped part 12 in this case is generally flat, the projection is carried out into a plane which is parallel to the plane of extent of the shaped part 12, i.e. in this case into the plane of the drawing. The outer contour of the cross-section of the profiled material therefore corresponds to the circumferential line 90 of the shaped part 12. Here too, an excess is added. The profiled material which is obtained in this way therefore corresponds to a rod which is generally crescent-shaped, the teeth, which the shaped part 12 has, already being provided on the inner side. The profiled piece which is obtained by suitable cutting this profiled material to length, is then pressed. During pressing and the deformation of the material occurring thereby, bearing extensions 92 are formed, which extend perpendicularly to the projection plane.

Figure 11:
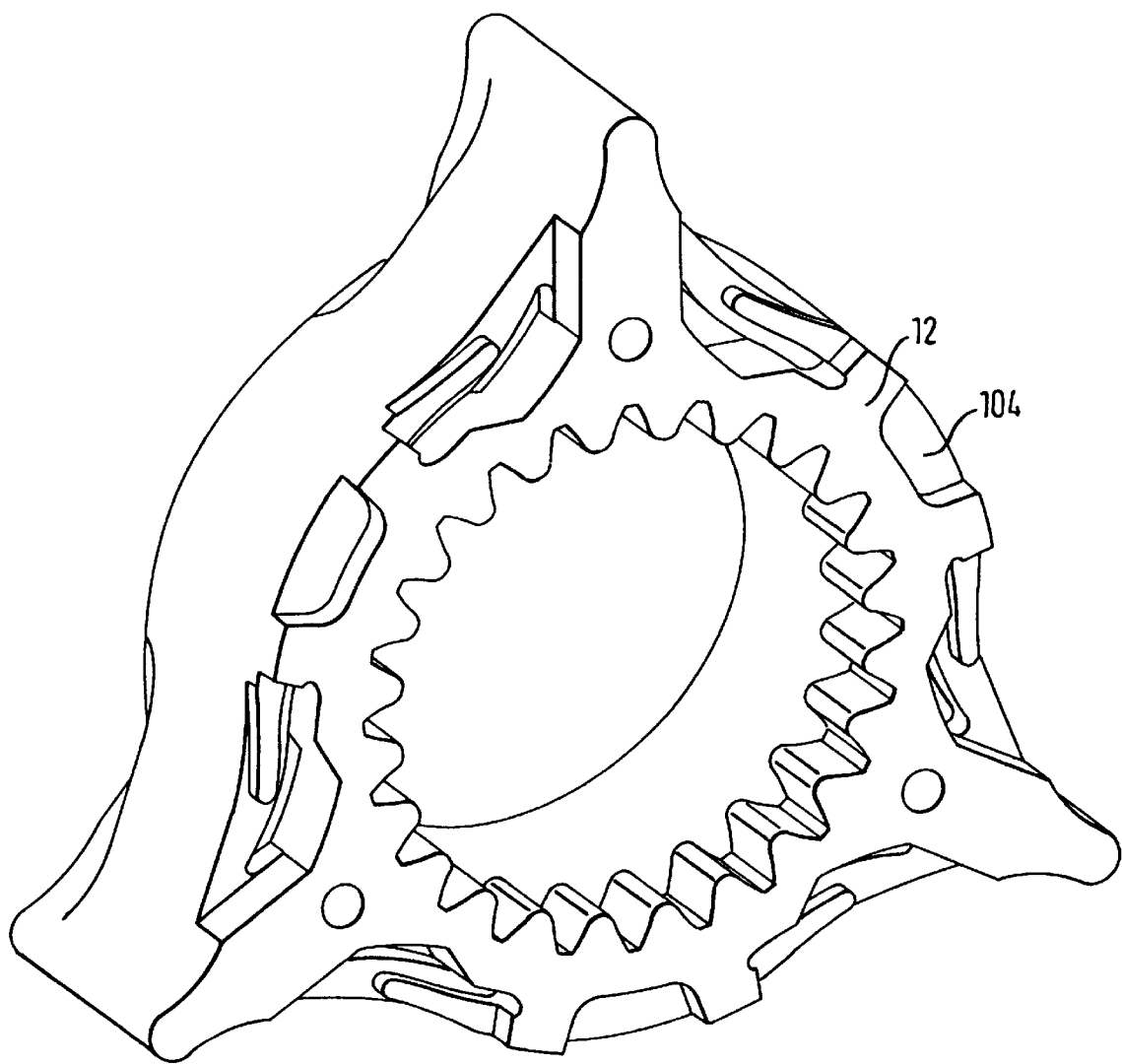
FIG. 11 shows a perspective view of another shaped part which was produced by a method according to the invention.
Figure 12:
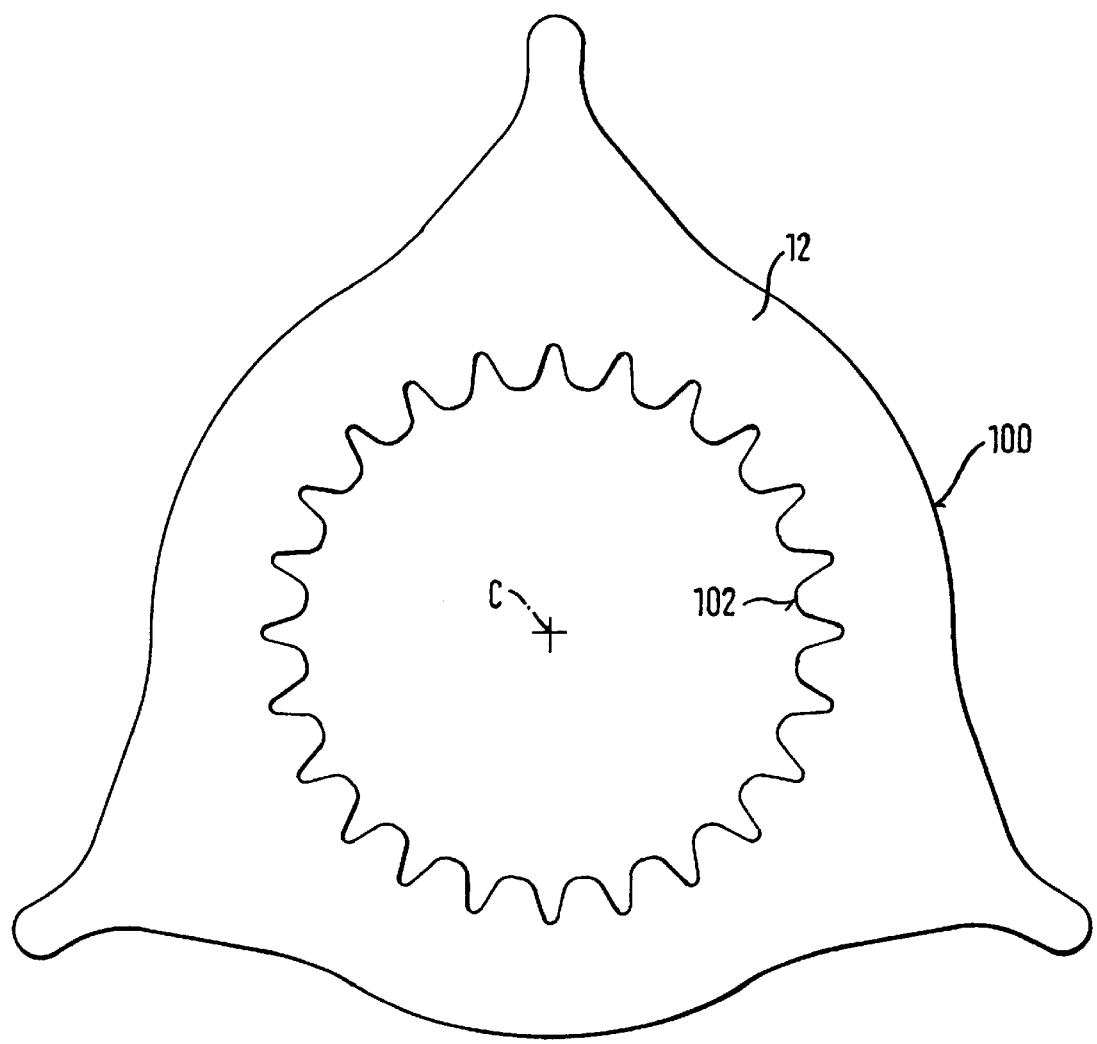
FIG. 12 shows a top view of the shaped part of FIG. 11.

In FIGS. 11 and 12, another shaped part 12 is illustrated, which was produced by the method according to the invention.

Figure 13:
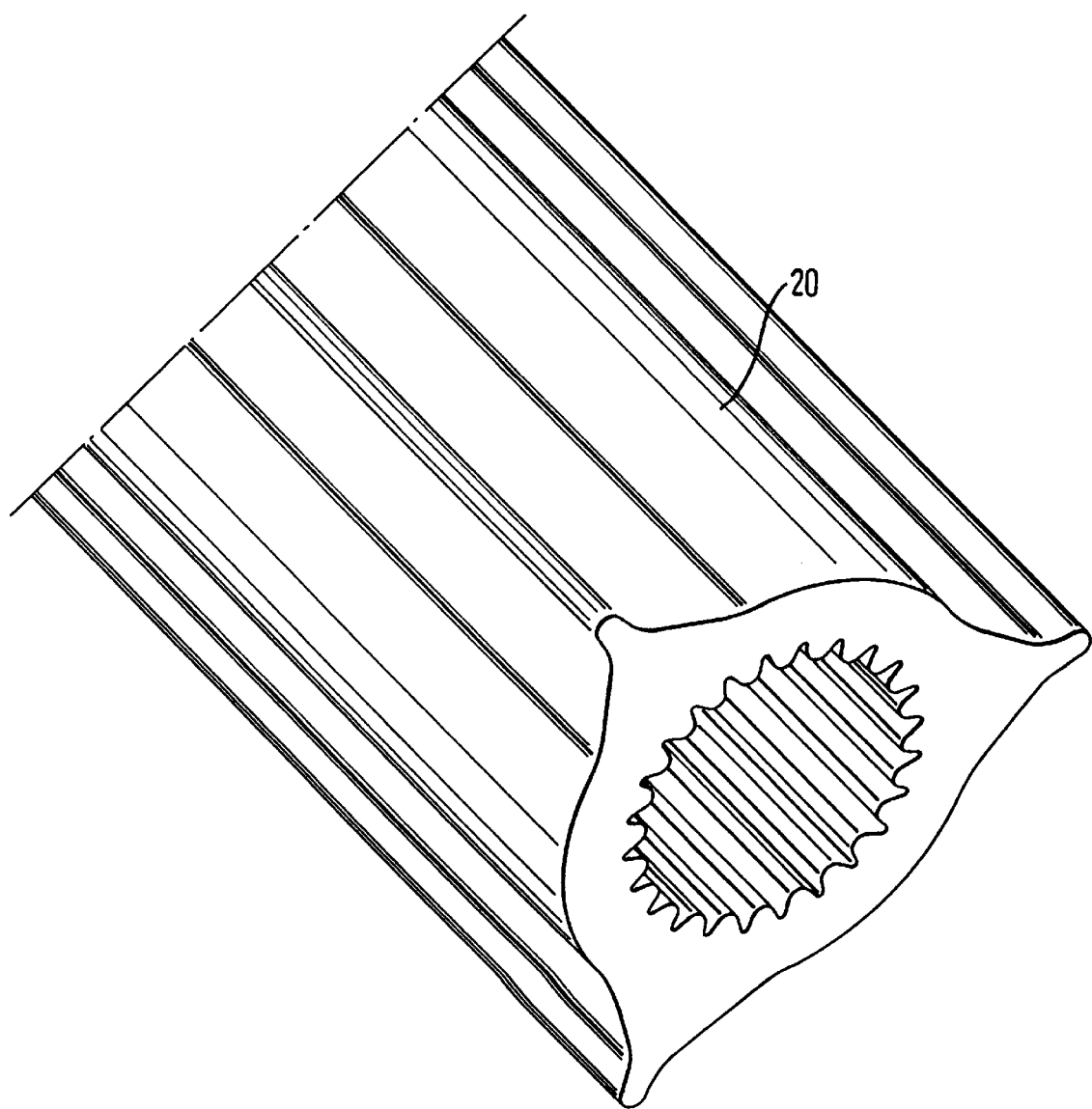
FIG. 13 shows a perspective view of a profiled material, starting from which the shaped part shown in FIG. 12 can be produced.

In this case, a rotary piston is shown, as is used for example in a rotary belt tensioner drive. The cross-section of the profiled material which is to be used is determined in a similar manner to the shaped part of FIGS. 7 and 8 by projection into a plane which is perpendicular to the central axis C. In this way, the external circumference line 100 and the internal circumference line 102 are produced. The profiled material 20 which is to be used is therefore a rod with a generally triangular outer contour and a toothed inner opening (see FIG. 13). The profiled piece which is obtained after cutting this profiled material to length is then pressed in order to obtain the shaped part 12. During the deformation which takes place thereby, recesses 104 (see FIG. 11) can be obtained.

If the shaped part 12 which is to be produced has undercuts, sliders can in addition be used in the press, by which these undercut sites are pressed.

What is claimed is:

1. A method for producing shaped parts, comprising the following steps:

a profiled material of an aluminum alloy is prepared;

a profiled piece of predetermined length is produced by cutting said profiled material to length;

said profiled piece is inserted into a press;

said profiled piece is pressed in said press into a shaped part and cold worked in a plurality of directions to increase the strength of the aluminum alloy, said shaped part, after pressing, having an excess of material, said excess of material being present as at least one local extension which is cut off after pressing;

said profiled material having a cross-section which is adapted to said shaped part to be produced; and said shaped part, when finished, having a configuration which is analyzed by defining an axis and an outline of said shaped part lying in a plane perpendicular to the axis, said profiled piece having a cross-section which corresponds to a projection of said shaped part to be produced plus an excess.

2. The method of claim 1, wherein said cross-section of said profiled piece differs from said outline of said shaped part by said excess.

3. The method of claim 1, wherein said profiled piece has a length which depends from an axial length of said configuration of said shaped part.

4. The method of claim 3, wherein said length of said profiled piece differs from said axial length of said shaped part by said excess.

5. The method of claim 1, wherein said excess is less than approximately 25%.

6. The method of claim 5, wherein said excess amounts to between approximately 10% and approximately 20%.

7. The method of claim 1, wherein said axis is a central axis of said shaped part and said cross-section of said profiled material is obtained based on a projection of said shaped part into said plane perpendicular to said central axis.

8. The method of claim 1, wherein said shaped part has a generally flat configuration, wherein said axis is perpendicular to a plane in which said shaped part extends, and wherein said cross-section of said profiled material is obtained based on a projection of said shaped part into said plane perpendicular to said axis.

9. The method of claim 1, wherein said profiled material is produced with said cross-section adapted to said shaped part which is to be produced.

10. The method of claim 9, wherein said cross-section of said profiled material is adapted to an outline of said shaped part, which is obtained by means of a projection.

11. The method of claim 1, wherein said profiled material has the strength classification of F17 to F50.

12. The method of claim 1, wherein said profiled material is soft-annealed before it is cut to length.

13. The method of claim 1, wherein said profiled piece is soft-annealed.

14. The method of claim 1, wherein said shaped part is hardened after pressing.

15. The method of claim 14, wherein said shaped part is thermally hardened.

16. The method of claim 14, wherein said shaped part is hardened by strain-hardening.

17. The method of claim 1, wherein said excess of material is present as at least one sheet-like excess which is removed after pressing.

18. The method of claim 1, wherein said shaped part is a load-bearing component of a vehicle occupant restraint system.

* * * * *